(12) United States Patent
Shor et al.

(10) Patent No.: US 10,122,386 B2
(45) Date of Patent: Nov. 6, 2018

(54) SYSTEM AND METHOD FOR ON-THE-FLY MODIFICATION OF THE PROPERTIES ON AN ACTIVE ANTENNA CARRIER IN RADIO BASE STATION COMMUNICATION OPERATION

(71) Applicant: FREESCALE SEMICONDUCTOR, INC., Austin, TX (US)

(72) Inventors: Roi Menahem Shor, Tel-Aviv (IL); Avraham Horn, Givat Shmuel (IL); Shay Shpritz, Hod Ha Sharon (IL)

(73) Assignee: NXP USA, Inc., Austin, TX (US)

( * ) Notice: Subject to any disclaimer, the term of this patent is extended or adjusted under 35 U.S.C. 154(b) by 364 days.

(21) Appl. No.: 14/969,879

(22) Filed: Dec. 15, 2015

(65) Prior Publication Data

US 2017/0171268 A1    Jun. 15, 2017

(51) Int. Cl.
*H04B 1/00* (2006.01)

(52) U.S. Cl.
CPC ..................... *H04B 1/00* (2013.01)

(58) Field of Classification Search
CPC ........................ H04L 65/4076; H04W 88/06
USPC ....................................................... 709/219
See application file for complete search history.

(56) References Cited

U.S. PATENT DOCUMENTS

| | | | |
|---|---|---|---|
| 6,212,169 B1 | 4/2001 | Bawa et al. | |
| 7,099,969 B2 | 8/2006 | McAfee et al. | |
| 7,924,054 B1 | 4/2011 | Doubler et al. | |
| 7,940,667 B1 | 5/2011 | Coady et al. | |
| 8,171,121 B2 | 5/2012 | Ayyar et al. | |
| 8,295,294 B2 | 10/2012 | Kerr et al. | |
| 8,443,126 B2 | 5/2013 | Elboim | |
| 8,599,827 B2 | 12/2013 | Irvine | |
| 8,676,273 B1* | 3/2014 | Fujisaki | H04M 1/6505 455/567 |
| 8,908,650 B2 | 12/2014 | Aarflot et al. | |
| 9,036,544 B2 | 5/2015 | Johansson et al. | |

(Continued)

FOREIGN PATENT DOCUMENTS

| | | |
|---|---|---|
| CN | 101082894 A | 12/2007 |
| EP | 2772109 A1 | 9/2014 |
| WO | 2017077361 A1 | 5/2017 |

OTHER PUBLICATIONS

Non-Final Office Action dated Dec. 14, 2017 for U.S. Appl. No. 14/824,684.

(Continued)

*Primary Examiner* — S M Rahman (57) ABSTRACT

A method performed by a radio base station, the method including receiving streaming data information, the data information includes a first portion from a first set of antenna carriers and a second portion from a second set of antenna carriers, wherein the first portion is to be processed prior to the second portion. The method further including streaming the first portion of the data information from a radio equipment control device in a first data frame over an interface link that is configured to operate based on a first mapping configuration that indicates a set of locations of the first data frame at which the first portion of information is to be streamed, and streaming the second portion of the data information from the REC device in a second data frame over the interface link that is configured to operate based on a second mapping configuration.

17 Claims, 5 Drawing Sheets

(56) References Cited

U.S. PATENT DOCUMENTS

| | | |
|---|---|---|
| 2004/0218565 A1 | 11/2004 | Davis |
| 2005/0105534 A1* | 5/2005 | Osterling ............... H04W 92/12 |
| | | 370/395.43 |
| 2005/0259616 A1 | 11/2005 | Major et al. |
| 2006/0049693 A1* | 3/2006 | Abraham ................ H04L 27/10 |
| | | 307/10.1 |
| 2008/0171569 A1 | 7/2008 | Pralle et al. |
| 2008/0225816 A1 | 9/2008 | Osterling et al. |
| 2009/0245228 A1 | 10/2009 | Osterling |
| 2010/0291955 A1 | 11/2010 | Sattele |
| 2011/0267956 A1* | 11/2011 | Yonge ................... H04L 12/413 |
| | | 370/241 |
| 2012/0057572 A1* | 3/2012 | Evans ................. H04W 88/085 |
| | | 370/338 |
| 2012/0250520 A1 | 10/2012 | Chen et al. |
| 2014/0289781 A1 | 9/2014 | Frydman et al. |
| 2014/0349640 A1 | 11/2014 | Fujita |
| 2016/0037580 A1* | 2/2016 | Shor ................... H04W 88/085 |
| | | 370/328 |
| 2017/0064661 A1 | 3/2017 | Katagiri et al. |
| 2017/0070440 A1 | 3/2017 | Hardt et al. |

OTHER PUBLICATIONS

U.S. Appl. No. 14/824,684, filed Aug. 12, 2015, entitled "System and Method for Radio Base Station Device Hot Switching and Hot Swapping".

U.S. Appl. No. 14/824,788, filed Aug. 12, 2015, entitled "System and Method for Radio Base Station Device Hot Reconnection (Hot Plugging)".

Notice of Allowance dated Sep. 6, 2017 for U.S. Appl. No. 14/969,581.

U.S. Appl. No. 14/969,581, filed Dec. 15, 2015, entitied"System and Method for Automatic Load Adaptive Antenna Carrier Bandwidth Dynamic Reconfiguration in Radio Base Station System".

U.S. Appl. No. 14/987,072, filed Jan. 2016, entitled "System and Method For Automatic Delay Compensation in a Radio Base Station System".

Ericsson AB, et al., "CPRI SpecificationV6.1: Common Public Radio Interface (CPRI) Interface Specification,"Section 2 (System Description, pp. 5-10) and Section 4.5 (Start-Up Sequence, pp. 62-70); Jul. 1, 2014; 129 pages.

U.S. Appl. No. 14/969,581, Inventor Roi Menahem Shor, "System and Method For Automatic Load Adaptive Antenna Carrier Bandwidth Dynamic Reconfiguration in Radio Base Station System", filed Dec. 15, 2015, Office Action—Notice of Allowance, dated Dec. 21, 2017.

U.S. Appl. No. 14/987,072, Inventor Roi Menahem Shor, "System and Method For Automatic Delay Compensation in a Radio Base Station System", filed Jan. 4, 2016, Office Action—Non-Final Rejection, dated Sep. 14, 2017.

Notice of Allowance dated Apr. 16, 2018 for U.S. Appl. No. 14/987,072, 9 pages.

Office action Final Rejection dated Jan. 19, 2018 for U.S. Appl. No. 14/987,072, 27 pages.

Notice of Allowance dated Mar. 27, 2018 for U.S. Appl. No. 14/969,581, 20 pages.

Office action Ex-parte Quayle dated Jul. 14, 2017 for U.S. Appl. No. 14/969,581, 9 pages.

Notice of Allowance dated Jun. 20, 2018 for U.S. Appl. No. 14/987,072, 10 pages.

\* cited by examiner

Basic Frame Configuration 290 ("Day") →

| AxC1 211 | AxC1 212 | AxC2 221 | AxC2 222 | AxC2 223 | AxC3 231 | AxC3 232 | AxC4 241 |

Basic Frame Configuration 291 ("Night") →

| AxC1 211 | AxC2 221 | AxC2 222 | AxC2 223 | AxC3 231 | AxC3 232 | AxC3 233 | AxC4 241 |

FIG. 2

Basic Frame Configuration 390 ("Day") → | AxC1 311 | AxC1 312 | AxC2 321 | AxC2 322 | AxC2 323 | AxC3 331 | AxC3 332 | AxC4 341 |

Basic Frame Configuration 391 ("Night") → | AxC1 311 | AxC3 333 | AxC2 321 | AxC2 322 | AxC2 323 | AxC3 331 | AxC3 332 | AxC4 341 |

SYSTEM AND METHOD FOR ON-THE-FLY MODIFICATION OF THE PROPERTIES ON AN ACTIVE ANTENNA CARRIER IN RADIO BASE STATION COMMUNICATION OPERATION

CROSS-REFERENCE TO RELATED APPLICATION(S)

The present application is related to co-pending U.S. patent application Ser. No. 14/969,581, entitled "SYSTEM AND METHOD FOR AUTOMATIC LOAD ADAPTIVE ANTENNA CARRIER BANDWIDTH DYNAMIC RECONFIGURATION IN RADIO BASE STATION SYSTEM," filed on Dec. 15, 2015.

FIELD OF THE DISCLOSURE

This disclosure generally relates to radio based communications, and more particularly to a radio base station system.

BACKGROUND

Radio base station systems (RBSs) operate to provide communication for one or more wireless user equipment units over one or more radio access networks of a cellular communication system. A radio access network is used by service providers to establish one or more point-to-point communication paths, e.g., such as a communication between two smart phones, a smart phone and a data server, and the like. An RBS has one or more radio equipment control (REC) devices, one or more radio equipment (RE) devices connected to one or more antennas that are used to facilitate the point-to-point communication paths defined by the service providers. The REC devices operate to communicate with the radio access networks via a network interface and the RE devices operate in conjunction with the antennas to communicate with the wireless user equipment units, such as smart phones, via an air interface which transmits and receives signals over the one or more antennas. The REC and RE devices operate with each other via the one or more interface links. The point-to-point information that is transmitted is streaming information based upon a particular streaming protocol, wherein a streaming protocol is a continuous stream of information that cannot be put on hold and has no re-transmission capabilities and, as such the interface links need to be operational for all communication to keep data from being dropped.

A typical RBS has a REC connected to a RE via an interface link having properties that are defined during a negotiation process. The properties are based upon the requests of one or more service providers. For example, a particular interface link can communicate information for multiple service providers, such as ATT, Sprint, and the like, and the amount of data, e.g., the data rate, the link communicates for each service provider, and the allocation and quality of each service provider's bandwidth, with respect to individual point-to-point communications generally referred to as antenna carriers in the CPRI specification, is defined by the service provider. To change the established properties of the link, the communication of streaming information over the link must be stopped in order to reconfigure the relevant properties of the link and the communication can only be restarted after the reconfiguration process has completed and at a specific communication data synchronization point. Such result in meaningful down time resulting in the loss of streaming data, and impacting the quality of service of the RBS.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

An embodiment of a radio base station system (RBS) is disclosed that includes a radio equipment control (REC) device, a radio equipment (RE) device, one or more antennas, and an interface link connected to the REC and the RE. During an initial configuration process of the interface link, a handshake process, referred to as an auto-negotiation, occurs between the REC and the RE to establish an initial link configuration based upon service provider requirements that is utilized by the REC and the RE to transmit frames containing streaming data over the interface link. Based upon the link configuration, each frame will include one or more antenna carriers. Each antenna carrier transmits streaming data that is associated with a different point-to-point communication. The initial antenna carriers' configuration specifies an initial mapping configuration of each frame that indicates where each antenna carrier transmitted over the frame is mapped. For example, the initial mapping configuration can indicate the order in which each antenna carrier of a set of antenna carriers is transmitted within a shared frame.

When the REC determines that the mapping of the link configuration is to change, such as when the set of antenna carriers using the initial link configuration is to change to include more or fewer antenna carriers, or to transmit a different amount of information amongst the antenna carriers, a different mapping configuration for the particular antenna carrier's frame is provided to the RE from the REC, along with timing information that indicates a future time at which the change is to occur. As such, prior to the indicated time at which a new link configuration is to be used, the RE and REC continue to communicate frames based on the current antenna carriers configuration while preparing for the second antenna carriers configuration. In this manner, the interface link between the REC and the RE can be reconfigured without downtime, e.g., no loss of antenna carrier streaming data during the change in link configuration, which is associated with the typical auto-negotiation process typically used to change the configuration of the interface link. Various embodiments of the present disclosure will be better understood with reference to the attached Figures.

Figure 1:
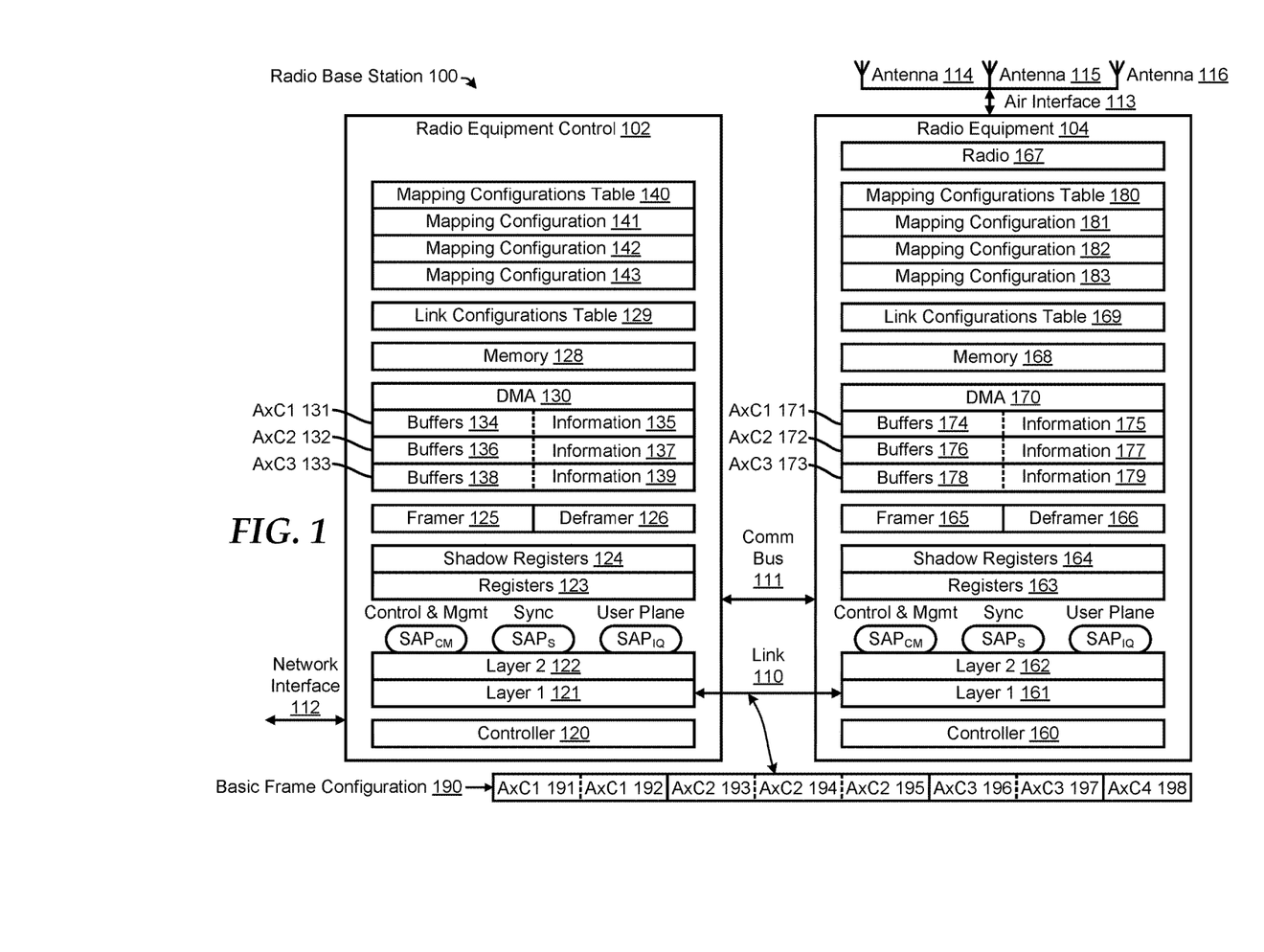
FIG. 1 is a block diagram illustrating a radio base station system including a radio equipment control device having a controller that performs on-the-fly modification of the properties of an active antenna carrier's communication over an interface link in operation, in accordance with at least one embodiment of the present disclosure.

FIG. 1 illustrates a radio base station system (RBS) 100 that performs on-the-fly modification of the properties of active antenna carriers' communication over an interface link in operation. RBS 100 includes a radio equipment control (REC) device 102 and a radio equipment (RE) device 104. REC 102 provides the radio functions of the digital baseband domain including the radio access network interface transport, transmit/receive of information between REC 102 and RE 104, the radio base station control and management, and the digital baseband processing. RE 104 provides the analogue and radio frequency functions including filtering, modulation, frequency conversion, and amplification. In an embodiment, RBS 100 includes a chain of REC devices connected to a chain of RE devices.

REC 102 communicates with one or more radio access networks of a cellular communications system (not illustrated) via a radio access network interface 112. Information over radio access network interface 112 is provided by one or more service providers, also referred herein as carriers and network carriers. RE 104 communicates with one or more wireless user equipment units (not shown) via an air interface 113 which transmits and receives signals over one or more antennas 114, 115, and 116. Examples of a wireless user equipment unit are mobile stations such as a mobile telephone, a wearable device such as a smart watch, a wireless robot, a laptop with mobile termination, an automobile telephone, a fixed wireless device, and the like, which can communicate voice, video, data, programs/program instructions, and the like with a radio access network.

REC 102 communicates with RE 104 via a communications link 110 and a communication bus 111. Link 110 is a point-to-point interface that provides a digital connection between REC 102 and RE 104. Link 110 may be a Common Public Radio Interface (CPRI) link as described in the Common Public Interface Specification, referred herein as the CPRI specification, an Open Base Station Architecture Initiative (OBSAI) interface link as described in the Open Base Station Architecture Initiative BTS System Reference Document, and the like. Link 110 may communicate using Ethernet protocol, High-level Data Link Control (HDLC) protocol, Layer 1 In band (L1 In band) protocol, and the like. Communication bus 111 may be an Ethernet bus, a Peripheral Component Interface (PCI) Express bus, and the like, and may operate outside link 110 utilizing a different communication protocol than link 110. Communication bus 111 can be used to support other communications between the RE, REC, and other devices as needed or desired.

RBS 100 can support a plurality of radio access networks such as an Universal Mobile Telecommunications System (UMTS) network, an evolved UMTS Terrestrial Radio Access (E_UTRA) network, a Worldwide Interoperability for Microwave Access (WiMAX) network, a Global System for Mobile (GSM) network, a Code Division Multiple Access (CDMA) network, a wideband CDMA network, a Time Division Multiple Access (TDMA) network, a Long Term Evolution (LTE) network, a Long Term Evolution Advanced (LTE-A) network, and the like, as appropriate for the application.

REC 102 includes a controller 120, a layer 1 interface 121 connected to link 110, a layer 2 interface 122, a service access point ($SAP_{CM}$) for control and management, a service access point (SAPs) for synchronization, a service access point (IQ) data ($SAP_{IQ}$) for In-Phase and Quadrature, registers 123, shadow registers 124, a framer 125, a deframer 126, a direct memory access (DMA) 130, a memory 128, a link configurations table 129, and a mapping configurations table 140.

Controller 120 performs a configuration process to implement an initial link configuration based on an initial mapping configuration to be utilized by REC 102 and RE 104 during communication over link 110. As will be discussed in greater detail below, the mapping configuration is based upon requirements provided by one or more service providers. For example, based upon a first service provider's requirements a given frame will transmit a given number of antenna carriers on behalf of the first service provider at a certain quality level, e.g., at a give data rate, and based upon a second service provider's requirements the frame will transmit the same or a different number of antenna carriers at the same or different quality level, and so on for other service providers.

The current link configuration is based upon the information stored at registers 123, which is configured by controller. Controller 120 may also perform a reconfiguration process to implement a different link configuration based upon a different mapping configuration for one or more antenna carriers. In response to controller 120 determining that the link configuration is to change, such as when the set of antenna carriers using the initial link configuration is to change, described in further detail below, controller 120 can perform the reconfiguration process that changes the set of antenna carriers. During the reconfiguration process, shadow registers 124 are configured by controller 120 with the different mapping configuration in advance of the change. The entries of shadow registers 124 correspond to some or all of registers 123. Controller 120 can configure registers 123 from the entries of shadow registers 124 concurrently with that of a controller of RE 104 to implement link configuration changes concurrently, which will be described in greater detail herein.

Link configurations table 129 includes information identifying various configurations of link 110 that are capable of being supported by REC 102. During an auto-negotiation process as described in the CPRI specification, controller 120 of REC 102 utilizes the information in link configurations table 129 to identify various link configurations that are supported by both REC 102 and RE 104. In particular, link configurations table 129 may include a link total available bit rate of the interface link, a link protocol of the interface link, a seed that is used for scrambling data sent over the link, and the control and management link characteristics having a fast/slow control and management link bit rate of the interface. In an embodiment, scrambling the data is utilized when high link bit rates of the interface are used. In an embodiment, controller 120 configures link configurations table 129 during a configuration process prior to bringing link 110 into operation. For example, according to an embodiment, controller 120 configures link configurations table 129 during a reset, a restart, an initialization, an update process, and the like.

Mapping configurations table 140 includes a plurality of mapping configuration entries, each of which has a different mapping for the same or different sets of antenna carriers that can be used to be used to configure link 110. REC 102 provides management of mapping configurations table 140, which may include adding or deleting mapping configuration entries as needed for RBS 100 operation. As shown, mapping configurations table 140 includes entries for three antenna carrier mappings configurations 141, 142, and 143. One of these mapping configurations can correspond to a current link configuration, and the others to a previous, or next, link configuration. It will be appreciated that mapping configurations table 140 can also include information that defines specific characteristics of each one of antenna carriers of the set of antenna carriers. For example, the mapping configuration table can indicate a bandwidth of each antenna carrier, where the bandwidth defines a number of samples of a frame over which a specific antenna carrier is transmitted, a width of each sample, and the like. In an embodiment, controller 120 configures mapping configurations table 140 during a configuration process prior to bringing link 110 into operation.

Three different information flows (protocol data planes) are multiplexed over link 110 including data flows of user plane data, control and management plane data, and synchronization plane data. The control plane (control data flow) is used for point-to-point communication processing; the management plane (management data flow) data is management information for the operation, administration and maintenance of link 110, REC 102, and RE 104; the user plane (user data flow) data (IQ data) includes antenna carrier data that has to be transferred from RBS 100 to the user equipment devices, e.g., a mobile phone user, and visa versa, and the synchronization data flow transfers synchronization and timing information between REC 102 and RE 104. In addition to the user plane data, control and management (C&M) control signals as well as synchronization control signals are exchanged between REC 102 and RE 104. All information flows or "planes", including both control and user data, are multiplexed onto link 110 using layer 1 interface 121 and layer 2 interface 122 protocols via the appropriate service access points (SAP-S).

Layer 1 interface 121 is a physical layer interface that performs low level signaling and time division multiplexing of different data flows over link 110, where the data flows correspond to user plane data, control and management plane data, and synchronization plane data, as previously described. Layer 1 interface 121 provides communication interfaces, such as an electrical signal transmitted via an electrical interconnect having electrical characteristics, or an optical signal transmitted via an optical interface having optical characteristics.

Layer 2 interface 122 is a data link layer that provides flexibility and scalability for providing different layer 2 protocols. For example, the data link layer may implement a High-level Data Link Control (HDLC) slow control and management channel, an Ethernet fast control and management channel, and a vendor specific (VSS) control and management channel. Layer 2 interface 122 may further provide media access control, flow control, and data protection of the control and management information flow over link 110 via REC 102. Layer 2 service access points (SAP-S) are defined for the information planes or data flows and are denoted as $SAP_{CM}$, $SAP_S$, and $SAP_{IQ}$ of REC 102.

$SAP_{CM}$, $SAP_S$, and $SAP_{IQ}$ are defined on a per link basis, where for a given link, $SAP_{CM}$ is mapped to receive an information flow of control plane data and management plane data for that link, $SAP_S$ is mapped to an information flow of synchronization plane data for that link, and $SAP_{IQ}$ is mapped to an information flow of user plane data based on IQ complex data for that link.

REC 102 can also communicate control, management, and synchronization information to RE 104 via communication bus 111 utilizing protocols of communication bus 111, outside of link 110. Similarly, REC 102 may also receive information from RE 104 via communication bus 111.

REC 102 and RE 104 may communicate user plane data over link 110 as frames of data, where each frame has a basic frame configuration. Each frame contains data of one or more antenna carriers that are mapped within each frame based on a mapping configuration such as, for example, mapping configuration 141 entry of the antenna carrier configurations table 140. A frame is also referred herein as a basic frame, and its frame configuration can be referred herein as a basic frame configuration, and can have the basic frame structure as described in the CPRI specification. In an embodiment, a radio frame is transmitted over link 110 that includes a specified number of hyper frames, where a hyper frame includes a specified number of frames. For example, a radio frame includes 150 hyper frames and each hyper frame includes 256 basic frames, as described in the CPRI specification. It will be appreciated that the number of hyper frames included in a radio frame can be any number greater than or equal to zero, the number of frames included in a radio frame can be any number greater than or equal to one, and the number of frames included in a hyper frame can be any number greater than or equal to one. As such, a radio frame can include only frames, or can include a hierarchy of hyper frames and frames.

An exemplary basic frame configuration 190 is shown that is configured to transmit four antenna carriers in a streaming manner over a sequence of frames. As illustrated, frame configuration 190 has a total of eight sample locations, referred to as antenna carrier samples, each of which can transmit an agreed upon amount of data on behalf of one antenna carrier. The four antenna carriers of basic frame configuration 190 are labeled AxC1, AxC2, AxC3, and AxC4. In the illustrated embodiment, AxC1 includes two antenna carrier samples 191-192, AxC2 includes three antenna carrier samples 193-195, AxC3 includes two antenna carrier samples 196-197, and AxC4 includes one antenna carrier sample 198. The data rate of a particular antenna carrier of basic frame configuration 190 is based on the number of antenna carrier samples of a basic frame that are allocated to transmitting data on behalf of that antenna carrier. Thus, assuming a fixed sample width for each antenna carrier, the data rate of AxC2 is a 50% more than the data rate of AxC1 and AxC3 by virtue of having three data samples instead of two, and three times the data rate of AxC4 by virtue of AxC4 having only one sample while AxC2 has three samples.

The actual data rate of a particular antenna carrier is also based upon the data rate at which link 110 operates, which can be agreed upon by RE 104 and REC 102 during configuration. By way of example, it is presumed herein that an antenna carrier having four samples in its basic frame has a 10 Mhz LTE bandwidth over link 110, e.g., a particular data rate, while an antenna carrier having two samples in a basic frame has a 5 MHz LTE bandwidth. It will be appreciated, that the data width of a given antenna carrier sample can affect the data rate of an antenna carrier as well.

Registers 123 includes all of the operating registers of REC 102 including link 110 configuration and status registers. Controller 120 configures registers 123 during an auto-negotiation and initializes registers 123 to enable communication between REC 102 and RE 104 and to operate link 110 based on a mapping configuration entry stored at mapping configurations table 140. Registers 123 include transmit/receive antenna carriers control registers such as, for example: registers that indicate the state of each antenna carrier, where the state of the antenna carrier may be an active state or an inactive state; DMA transmit/receive control registers that indicate source and destination addresses; transmit/receive sample width and number of antenna carriers registers; and mapping information that indicates how data associated with the active antenna carriers' data is mapped within a frame, i.e. the mapping configuration that is communicated between REC 102 and RE 104 on link 110. In an embodiment, registers 123 may support a CPRI having CPRI transmit/receive antenna carrier control registers, CPRI DMA transmit/receive control registers, CPRI transmit/receive status registers, CPRI transmit/receive sample width and number of antenna carriers registers, and CPRI frame number registers.

Framer 125 multiplexes the data streams of multiple antenna carriers into frames for transmission over link 110 to RE 104 based on a mapping configuration, such as, for example, mapping configuration 141. Frames received by REC 102 from RE 104 are provided to deframer 126, which de-multiplexes the antenna carrier information based upon the basic frame configuration 190, as well as other data flow, control and management, and layer 1 interface 121 timing and maintenance information from the frame based on a mapping configuration, such as, for example, mapping configuration 141, and distributes to the appropriate SAP.

RE 104 includes a controller 160, a layer 1 interface 161 connected to link 110, a layer 2 interface 162, a $SAP_{CM}$ for control and management, a $SAP_S$ for synchronization, a $SAP_{IQ}$ for In-Phase and Quadrature (IQ) data, registers 163, shadow registers 164, a framer 165, a deframer 166, a radio 167, a DMA 170, a memory 168, a link configurations table 169, and a mapping configurations table 180.

Controller 160 performs a configuration process of the interface link that is initiated by REC 102 to determine and implement a first link configuration based on a first mapping configuration of the antenna carriers. Registers 163 are configured by controller 160 to implement the first link configuration. Controller 160 may also perform a reconfiguration process of the interface link that is initiated by REC 102 to implement a second link configuration that uses a different mapping configuration. In preparation for the change in the link configuration, shadow registers 164 are configured by controller 160 with the second mapping configuration received from REC 102 in advance of the change. The entries of shadow registers 164 correspond to some or all of registers 163. Controller 160 configures registers 163 from the entries of shadow registers 164 when the link configuration changes operation based on the second mapping configuration, which will be described in greater detail herein.

Link configurations table 169 provides similar functionality as link configurations table 129 and includes link configurations information including various link configurations of link 110 that are supported by RE 104. Controller 160 utilizes the information in link configurations table 169 during the auto-negotiation between REC 102 and RE 104 to determine the link configuration of link 110 that both REC 102 and RE 104 support. In an embodiment, controller 160 configures link configurations table 169 during a configuration process prior to bringing link 110 into operation. In another embodiment, controller 160 configures link configurations table 169 during a reset, a restart, an initialization, an update process, and the like.

Mapping configurations table 180 provides similar functionality as mapping configurations table 140, and is managed by RE 104, which can add, remove, or change entries as needed—primarily in response to information received from the REC 102. In the illustrated embodiment, table 180 includes three mapping configurations 181, 182, and 183, where each mapping configuration 181-183 includes mapping information. Based upon the above stated assumptions, mapping configuration entry 181 is presumed to have a common set of mapping configuration entries as does mapping configuration entry 141, mapping configuration entry 182 is presumed to have a common set of mapping configuration entries as does mapping configuration entry 142, and mapping configuration entry 183 is presumed to have a common set of mapping configuration entries as does mapping configuration entry 143. In an embodiment, controller 160 configures mapping configurations table 180 for an initial mapping configuration entry such as, for example, mapping configuration entries 181-183 during an initialization process, wherein the initial mapping configuration is also stored at a mapping configuration entry of REC 102, which is presumed to be mapping configuration entries 141-143. Controller 160 can add additional mapping configuration entries during operation of link 110.

DMA 170 can include a plurality of sets of buffers and associated information; each set of buffers of the plurality, and associated information, is associated with a particular antenna carrier and can be allocated by controller 160 during a configuration process. As shown, DMA 170 includes three sets of buffers 174, 176, 178 and associated information, 175, 177, 179, which can correspond to antenna carriers AxC1, AxC2, and AxC3, respectively. Each set of buffers 174, 176, and 178 include a receive buffer and a transmit buffer that allows the transfer of data over link 110 in an efficient manner.

Layer 1 interface 161 is a physical layer interface that provides similar functionality as layer 1 interface 121 and performs low level signaling and time division multiplexing of different data flows over link 110, where the data flows correspond to user plane data, control and management plane data, and synchronization plane data, as previously described. Layer 1 interface 121 provides communication interfaces, such as an electrical signal transmitted via an electrical interconnect having electrical characteristics, or an optical signal transmitted via an optical interface having optical characteristics.

Layer 2 interface 162 provides similar functionality as layer 2 interface 122 and provides RE 104 access to the different information flows via service access points $SAP_{CM}$, $SAP_S$, and $SAP_{IQ}$ of RE 104 which correspond to service access points $SAP_{CM}$, $SAP_S$, and $SAP_{IQ}$ of REC 102. $SAP_{CM}$, $SAP_S$, and $SAP_{IQ}$ of RE 104 provide similar functionality as $SAP_{CM}$, $SAP_S$, and $SAP_{IQ}$ of REC 102 and are each associated with $SAP_{CM}$, $SAP_S$, and SAN of REC 102, respectively.

RE 104 can also receive control, management, and synchronization information from REC 102 via communication bus 111 utilizing protocols of communication bus 111. Similarly, RE 104 may also provide information to REC 102 via communication bus 111. Communication bus 111 may allow REC 102 and REC 104 to communicate information in a more efficient manner than communication over link 110 and may allow the use of other protocols outside of link 110.

Registers 163 provide similar functionality as registers 123 and include operating registers of RE 104 including the link 110 configuration and status registers. Controller 160 configures registers 163 during an auto-negotiation to initialize registers 163 to enable communication between REC 102 and RE 104 over link 110 based on a mapping configuration of link 110 agreed upon with REC 102, such as, for example, by storing mapping information from mapping configuration 181 of RE 104 having corresponding mapping configuration 141 of REC 102. Controller 160 further reconfigures registers 163 to change operation of link 110 based on another mapping configuration provided by REC 102, as described in further detail below.

Framer 165 provides similar functionality as framer 125 and multiplexes data flow information received from radio 167, control and management information, synchronization information, and layer 1 interface 161 information into particular frames based on the link configuration at registers 163, which, with respect to antenna carrier data, can be based upon the mapping configuration 181.

Deframer 166 provides similar functionality as deframer 126 and extracts control and management data and layer 1 interface 161 maintenance data from a frame of data received from REC 102 based on the link configuration at registers 163, which includes extracting user plane data from the frame of data based on a given mapping configuration, such as, for example, mapping configuration 181, and forwards it to radio 167 for transmission to user equipment (not shown).

During operation, REC 102 operates link 110 between REC 102 and RE 104 based on a mapping configuration of link 110, such as, for example, the mapping configuration stored at mapping configuration 141. The selected mapping configuration includes mapping information and properties associated with a set antenna carriers based upon the requirements of one or more service providers, such as a data rate associated with each antenna carrier of a frame.

At the start of RBS 100 operation, a reset can occur, during which controller 120 of REC 102 initiates an auto-negotiation between REC 102 and RE 104, as described in detail below, to determine a link configuration of link 110 that is supported by both REC 102 and RE 104. As part of the reset process, REC 102 initializes mapping configurations table 140 to include an initial mapping configuration entry, and provides information to RE 104 to facilitate creation of the same mapping configuration entry at mapping configurations table 180 of RE 104. These entries are used when setting the registers 123 and 163 to ensure agreement between REC 102 and RE 104 on the configuration of the frames of data communicated on link 110.

Controller 120 of REC 102 can then perform a basic initialization that loads information from a mapping configuration entry stored at mapping configurations table 140, as well as other information, to registers 123 On the RE 104 side, registers 163 are configured to include the link configuration determined during auto-negotiation, which includes storing information at registers 163 from a mapping configuration entry, stored at mapping configurations table 180, that correspond to entries at the mapping configurations table 140 of REC 102. The selected mapping configuration can be, for example, mapping configuration 141 of REC 102 and mapping configuration 181 of RE 104. Once registers 123 is fully configured normal operation utilizing link 110 can begin.

During normal operation of link 110, e.g., while frames of streaming data for various antenna carriers are being transmitted, controller 120 can determine that the configuration of link 110 is to change to operate based on a different mapping configuration. For example, information stored at REC 102, which may have been received over network interface 112, can indicate that RBS 100 is to be configured differently based upon a current time period. For example, the configuration of link 110 can be different for daytime operation than for nighttime operation, different for weekdays than for weekend days, different for maintenance and not maintenance periods, different based upon a high verses low system load, and the like. According to an embodiment, in response to determining a configuration change is to occur, the REC 102 will generate a new mapping configuration entry, e.g., mapping configuration entry 142, if it does not already exist, having the new configuration information.

It will be appreciated that the bandwidth that will be allocated to each of the set of active antenna carriers utilizing the new mapping configuration may be more or less than the bandwidth of each of the set of active antenna carriers utilizing the current mapping configuration. The sample width that will be utilized for each of the set of active antenna carriers utilizing the new mapping configuration may also be smaller or larger than the sample width of each of the set of active antenna carriers utilizing the current mapping configuration. The set of active antenna carriers, the mapping of data of each of the set of active antenna carriers, and the properties for each of the set of active antenna carriers may also be changed when operation changes between the current and new mapping configurations.

In response to determining a new mapping configuration is to be used, REC 102 further provides information to RE 104 that allows a corresponding mapping configuration entry to be generated at mapping configuration table 180, or identifying an existing entry of mapping configuration table 180 that is to be used to facilitate the configuration change. It will be appreciated that REC 102 and RE 104 need to reconfigure their registers 123 and 163 at substantially the same time to ensure streaming data is not dropped. Thus, controller 120 also determines when the link 110 configuration is to change, and communicates this information to controller 160. In an embodiment, the controller 120 can provide a frame ID of a future frame at which the new link configuration is to be first implemented. The frame ID can be associated with a basic frame, a hyper frame, or a radio frame. Other identifying information can be used, such as a frame count that identifies how many more frames will be transmitted using the current link configuration before frames are transmitted using the new link configuration. In an embodiment, the new configuration information can be transmitted over communication bus 111 or other communication channel that operates outside link 110, in the form of an Ethernet packet, or other protocol.

In preparation for the change in link configuration, controllers 120 and 160 store the new mapping information at shadow registers 124 and 164, respectively, from the mapping configuration entries containing the new information, e.g., entries 142 and 182.

In response to each of REC 102 and RE 104 determining that the indicator as to when link 110 is to change operation has arrived, controller 120 updates registers 123 with values stored at shadow registers 124 and controller 160 updates registers 163 with the values at shadow registers 164 to effectuate the mapping configuration change with transmission of the next packet, as identified by the controller 120.

For example controllers 120 and 160 can update registers 123 and 163 with the values at shadow registers 124 and 164 in the last radio frame that immediately precedes the frame having the specific radio frame number before the change is to occur (i.e. the radio frame boundary of the change of link operation) to prevent a loss of antenna carrier data. For example, registers related to the changes in mapping configuration can be updated prior to the radio frame boundary to allow appropriate streaming data of the antenna carriers to be available for transmission at the start of the radio frame boundary of the specific radio frame number. Other configuration registers of registers 123 and 163 can be updated after the radio frame boundary, as needed to ensure proper operation. For example, controllers 120 and 160 can update some portions of registers 123 and 163 in the last radio frame that immediately precedes the frame having the specific radio frame number, e.g., before the change is to occur, as described above, and update other portions of registers 123 and 163 at the very end of processing the last radio frame after all the data of the last radio frame has already been received.

After the configuration change, REC 102 and RE 104 continue operation of link 110 based on the new mapping configuration of link 110, now the current mapping configuration. For example, based upon the mapping configuration of entry 142. Similarly, RE 104 continues operation of link 110 based on the updated desired new mapping configuration of link 110. For example, based upon the mapping configuration 182 of mapping configurations table 180 of RE 104.

By pre-configuring shadow registers 124 and 164 of controllers 120 and 160 based on the second mapping configuration, the time to change operation of link 110 is reduced as opposed to having to implement an auto-negotiation. Having a pre-determined and agreed upon radio frame having a specific radio frame number to be transmitted and received when link 110 operation is to change and changing operation before the radio frame having the specific radio frame number starts, allows the mapping configuration of link 110 to be changed without stopping operation of link 110. In this manner, performing on-the-fly modification of the properties of active antenna carriers' communication over link 110 between REC 102 and RE 104 allows antenna carriers' communication to be continuous without any disruption, and modifications of the antenna carriers' communication as operating conditions warrant. For example, all data of the antenna carriers' communication is transmitted, as opposed to some data being discarded.

Figure 2:
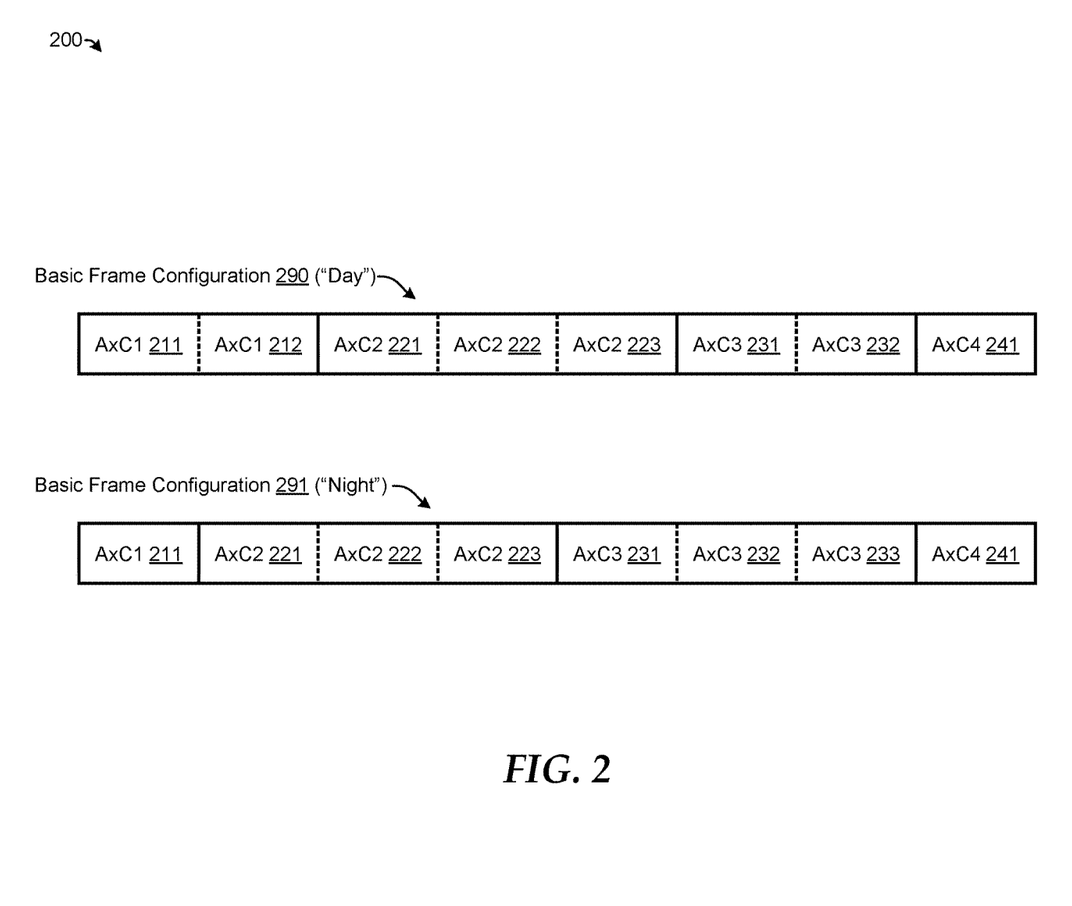
FIG. 2 is a block diagram illustrating basic representations of two possible basic frame configurations that may be utilized to communicate frames of data over an interface link between a radio equipment control device and a radio equipment device, in accordance with at least one embodiment of the present disclosure.
Figure 3:
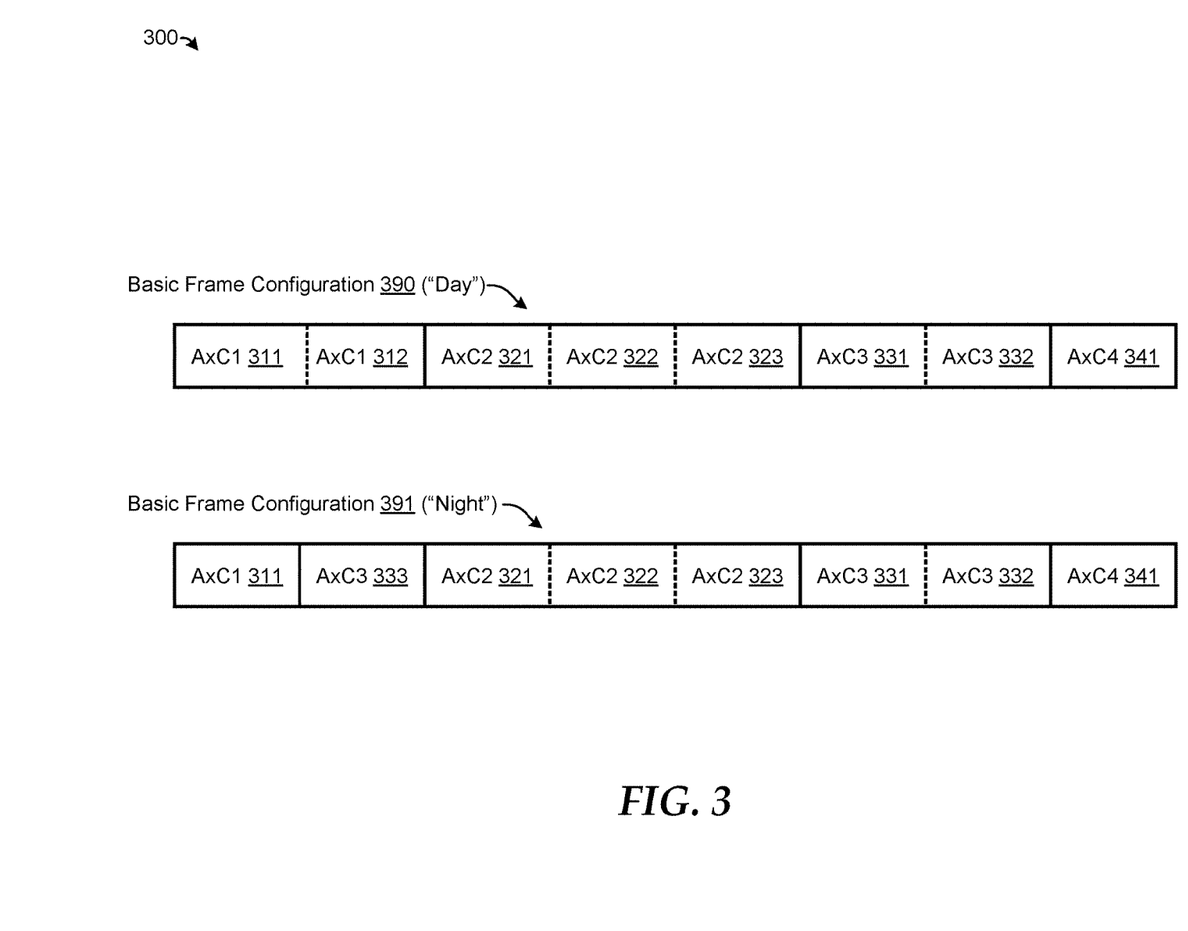
FIG. 3 is a block diagram illustrating another basic representations of two possible basic frame configurations that may be utilized to communicate frames of data over an interface link between a radio equipment control device and a radio equipment device, in accordance with at least one embodiment of the present disclosure.
Figure 4:
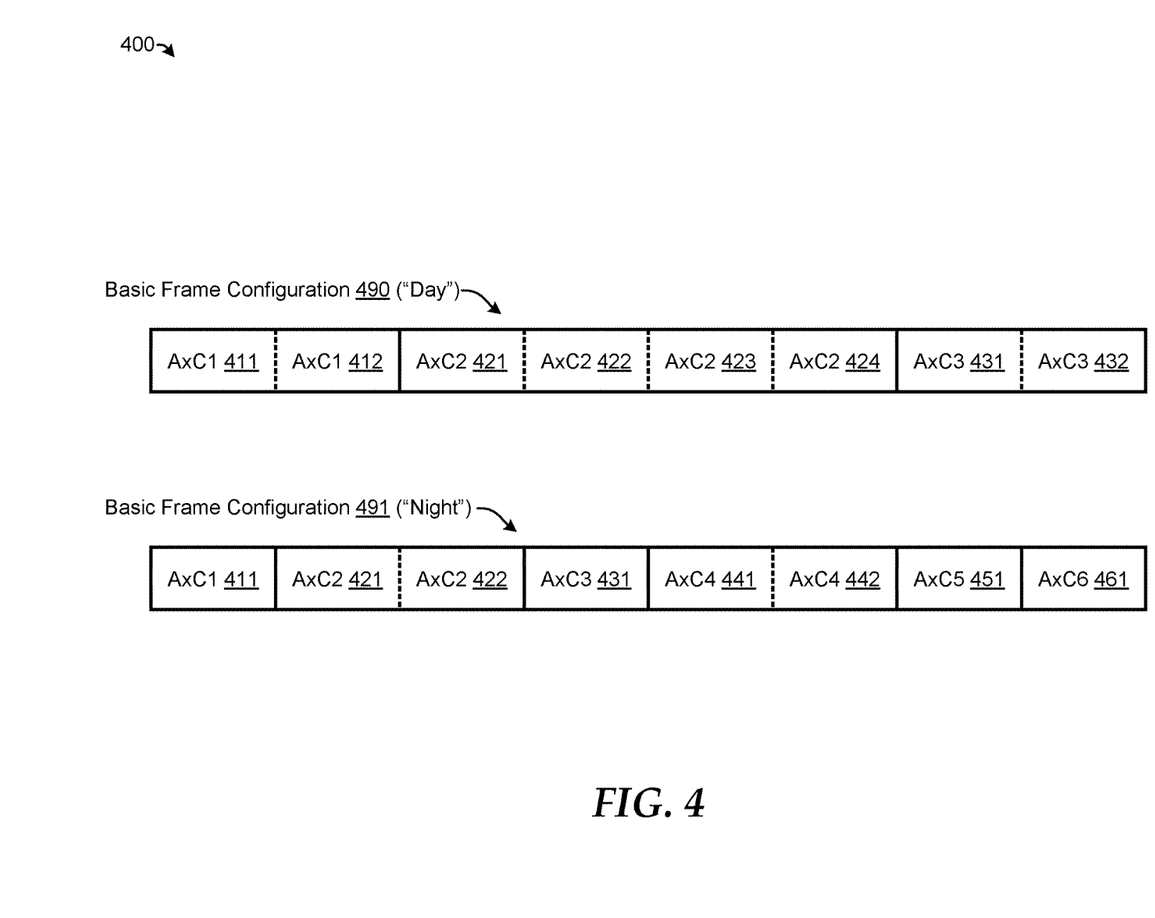
FIG. 4 is a block diagram illustrating another basic representations of two possible basic frame configurations that may be utilized to communicate frames of data over an interface link between a radio equipment control device and a radio equipment device, in accordance with at least one embodiment of the present disclosure.

FIGS. 2-4 each illustrate a pair of basic frame configurations, one for a current link configuration, the other for a new link configuration to be implemented in response to a configuration change. Referring to FIG. 2, basic frame configuration 290 of FIG. 2 represents the basic frame configuration for a current link configuration. By way of example, it is presumed the mapping information for basic frame configuration 290 is stored at mapping configuration entries 141 and 181, of REC 102 and RE 104, respectively. Basic frame configuration 291 of FIG. 2 represents the basic frame configuration for a next link configuration to be implemented by the configuration change. By way of example, it is presumed the mapping information for basic frame configuration 291 has been stored at mapping configuration entries 142 and 182, of REC 102 and RE 104, respectively. Basic frame configuration 290 includes two samples of IQ data of antenna carrier AxC1 211-212, three samples of IQ data of antenna carrier AxC2 221-223, two samples of IQ data of antenna carrier AxC3 231-232, and one IQ sample of data of antenna carrier AxC4 241. Basic frame configuration 291 includes one sample of IQ data of antenna carrier AxC1 211, three samples of IQ data of antenna carrier AxC2 221-223, three samples of IQ data of antenna carrier AxC3 231-233, and one sample of IQ data of antenna carrier AxC4 241.

It will be appreciated, based upon the previous discussion, that the set of antenna carriers being transmitted in each frame instance will be the same before and after the configuration change, by virtue of streaming data for each of AxC1-AxC4 being included in frames based on either of the basic frame configurations 290 and 291. However, the mapping of frames prior to and after the configuration change differs by virtue of different allocations of antenna carrier samples. Specifically, assuming the data width of all samples is the same, the configuration change from basic frame configuration 290 to basic frame configuration 291 results in the data rate of AxC1 being reduced by 50%, the data rate of AxC2 remaining the same, the data rate of AxC3 increasing by 50%, and the data rate of AxC4 remaining the same.

FIG. 3 illustrates another embodiment, wherein basic frame configuration 390 represents a current link configuration of link 110. By way of example, it is presumed the mapping information for basic frame configuration 390 is stored at mapping configuration entries 141 and 181, of REC 102 and RE 104, respectively. Basic frame configuration 390 includes two samples of IQ data of antenna carrier AxC1 311-312, three samples of IQ data of antenna carrier AxC2 321-323, two samples of IQ data of antenna carrier AxC3 331-332, and one IQ sample of data of antenna carrier AxC4 341. Basic frame configuration 391 represents the basic frame configuration for a next link configuration to be implemented in response to a configuration change as descried above. By way of example, it is presumed the mapping information for basic frame configuration 391 is stored at mapping configuration entries 142 and 182, of REC 102 and RE 104, respectively. Basic frame configuration 391 includes one sample of IQ data of antenna carrier AxC1 311, three samples of IQ data of antenna carrier AxC2 321-323, three samples of IQ data of antenna carrier AxC3 331-333, and one sample of IQ data of antenna carrier AxC4 341.

It will be appreciated, based upon the previous discussion, that the set of antenna carriers being transmitted in each frame instance will be the same before and after the configuration change, by virtue of streaming data for each of AxC1-AxC4 being included in frames based on either of the basic frame configurations 390 and 391. However, the mapping of frames prior to and after the configuration change differs by virtue of different allocations of antenna carrier samples. Specifically, assuming the data width of all samples is the same, the configuration change from basic frame configuration 390 to basic frame configuration 391 results in the data rate of AxC1 being reduced by 50%, the data rate of AxC2 remaining the same, the data rate of AxC3 increasing by 50%, and the data rate of AxC4 remaining the same.

FIG. 4 illustrates another embodiment, wherein basic frame configuration 490 represents a current link configuration of link 110. By way of example, it is presumed the mapping information for basic frame configuration 490 is stored at mapping configuration entries 141 and 181, of REC 102 and RE 104, respectively. Basic frame configuration 490 includes two samples of IQ data of antenna carrier AxC1 411-412, four samples of IQ data of antenna carrier AxC2 421-424, and two samples of IQ data of antenna carrier AxC3 431-432. Basic frame configuration 491 represents the basic frame configuration for a next link configuration to be implemented in response to a configuration change as descried above. By way of example, it is presumed the mapping information for basic frame configuration 491 is stored at mapping configuration entries 142 and 182, of REC 102 and RE 104, respectively. Basic frame configuration 491 includes one sample of IQ data of antenna carrier AxC1 411, two samples of IQ data of antenna carrier AxC2 421-422, one samples of IQ data of antenna carrier AxC3 431, two samples of IQ data of antenna carrier AxC4 441-442, one sample of IQ data of antenna carrier AxC5 451, and one sample of IQ data of antenna carrier AxC6 461.

It will be appreciated, based upon the previous discussion, that the set of antenna carriers transmitted in each frame after reconfiguration will be different than the set of antenna carriers transmitted in frames prior to reconfiguration, by virtue of streaming data for each of AxC1-AxC4 being included in frames prior to reconfiguration, and streaming data for each of AxC1-AxC6 being included in frames after reconfiguration. As such, more antenna carriers are carried by each frame instance based on basic frame configuration 491 than those based on basic frame configuration 490, but at a lower quality level. Specifically, assuming the data width of all samples is the same, the configuration change from basic frame configuration 490 to basic frame configuration 491 results in the data rate of AxC1 being reduced by 50%, the data rate of AxC2 being reduced by 50%, the data rate of AxC3 being reduced by 50%, and three additional antenna carriers, AxC4 through AxC6, each having a single antenna carrier sample.

Figure 5:
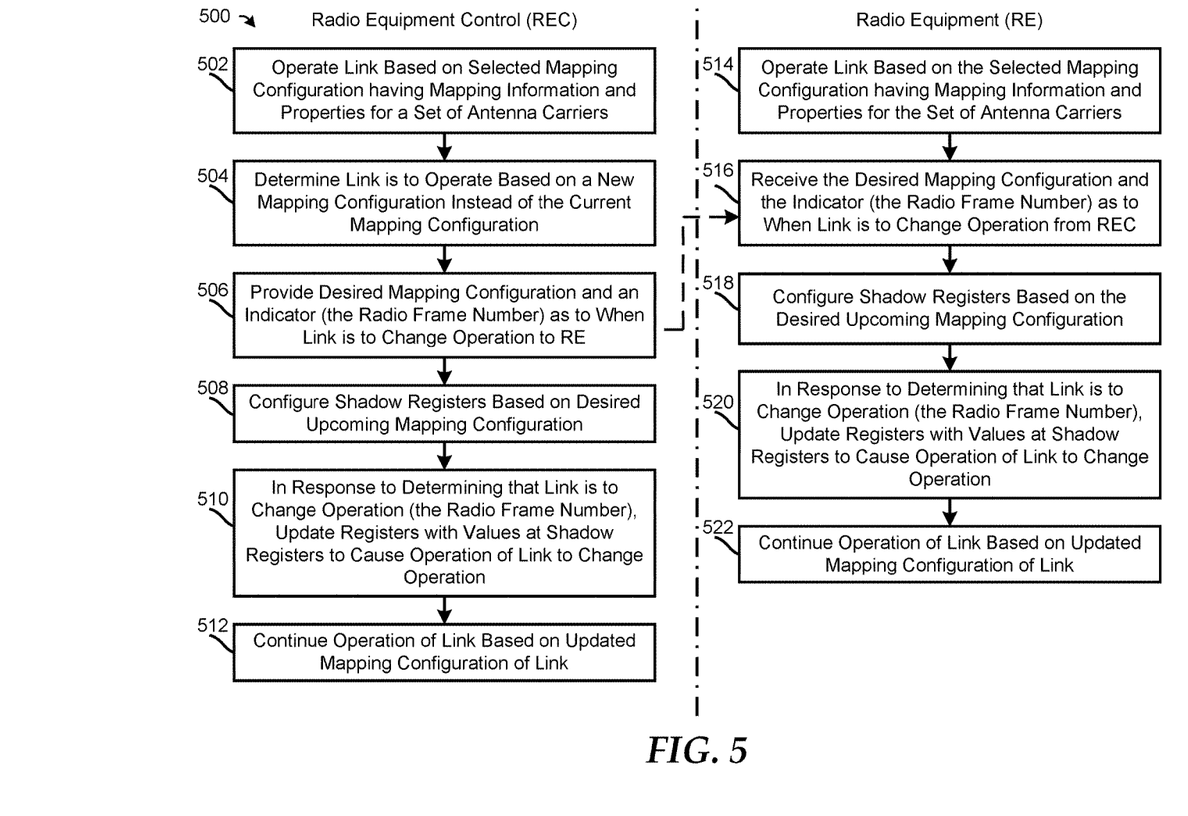
FIG. 5 illustrates a method for performing on-the-fly modification of properties of active antenna carriers' communication over an interface link in operation of the radio base station system of FIG. 1, in accordance with at least one embodiment of the present disclosure.

FIG. 5 illustrates a method 500 for performing on-the-fly reconfiguration of frames being transmitted between a REC and a RE. For example, on-the-fly reconfiguration can facilitate changing the mapping of antenna carriers transmitted over an interface link, such as during operation of the RBS 100 of FIG. 1, by changing the number of antenna carriers in a frame, the bandwidth of antenna carriers in the frame, and the like. The exemplary method 500 includes a flow at the left side of a dashed line beginning at block 502 that represents operation of the REC side of RBS 100, and a flow at the right side of the dashed line beginning at block 514 that represents operation of the RE side of RBS 100.

At block 502, REC 102 of RBS 100 bidirectionally operates link 110 between REC 102 and RE 104 in an uplink and a downlink direction based on a mapping configuration that was previously selected, such as during an initial configuration of link 110. During operation, in a downlink direction, the REC 102 receives streaming data at a network interface, such as network interface 112, for a set of antenna carriers that will be transmitted over link 110 to RE 104 over consecutive data frame instances as previously described. The received streaming data can be stored at various locations of REC 102 for processing prior to being transmitted. Each antenna carrier's streaming data is framed by a framer and transmitted over a specific set of the frame's antenna carrier samples as defined by the link's current configuration, which is based upon a current basic frame configuration as previously described. Similarly, in an uplink direction, REC 102 receives and stores streaming data over link 110 from RE 104 for the same set of antenna carriers, at the same sample locations, as it transmits along the downlink path. Each antenna carrier's streaming data is substantially simultaneously received at the same set of the frame's antenna carrier samples as with the downlink frames. The received uplink information is deframed and provided for additional processing before being provided to the network interface 112, for example.

For example, in the downlink direction, the network interface can receive streaming data for a plurality of antenna carriers that includes a first portion and a second portion of contiguous data. The term contiguous data, as used herein with respect to two portions of streaming data for a plurality of antenna carriers, is intended to indicate that the data stream of one or more of the antenna carriers of the plurality of antenna streams includes a time ordered sequence of data in each of the two portions. For example, with respect to a particular antenna carrier, the first portion of the streaming information will include a first in time order set of its streaming data to be transmitted over a first frame, and the second portion of the streaming information will include a second in time order set of its streaming data, contiguous in time order with the first set, that is to be transmitted over a second frame, wherein the first and second frame are contiguous with respect to the particular antenna carrier by virtue of transmitting contiguous streaming data for the particular antenna carrier. As described above, the frame configuration used to transmit the first portion of the streaming information can be different than the frame configuration used to transmit the second portion of streaming data. For example, the frame configuration used to transmit the second portion of data can have the same set of antenna carriers, but of different bandwidths. In another embodiment, the frame configuration used to transmit the second portion of data can have the different, but overlapping, set of antenna carriers, where the bandwidths of the overlapping set of antenna carriers can remain the same or different.

At block 504, REC 102 determines that link 110 needs to be configured based on a different antenna carriers configuration, presumed to be mapping configuration 142, instead of the current antenna carriers configuration, presumed to be mapping carriers configuration 142. The new mapping carriers' configuration can raise/lower the data bandwidth allocated to one or more specific antenna carriers, while leaving the bandwidth of the other antenna carriers unchanged, can add or remove antenna carriers associated with a particular frame, and the like. According to an embodiment, the reconfiguration can be a time based event that implements a different configuration based upon a time criteria, such as time of day, day of week, and the like.

At block 506, controller 120 of REC 102 provides information to RE 104 that indicates the mapping of the streaming data of particular antenna carriers will change at a future time. For example, REC 102 can provide to RE 104 the new mapping configuration of the particular antenna carriers that are to change, and a time indicator as to when link 110 is to change operation. The time indicator can, for example, identify a radio frame having a specific radio frame number to be received over link 110 that indicates when to change operation. The information provide by REC 102 to RE 104 is represented by the dashed arrow between block 506 and block 516. In an embodiment, RE 104 provides a confirmation to REC 102 that RE 104 has received the change information.

At block 508, controller 120 of REC 102 configures shadow registers 124 based on the new upcoming antenna carriers configuration. At block 510, in response to REC 102 determining that the time indicator as to when link 110 is to change operation indicates that operation is to change now, such as, for example, that the radio frame having the specific radio frame number is the next frame to be transmitted over link 110 to RE 104, controller 120 updates registers 123 with values at shadow registers 124 to cause the operation of link 110 to change operation. At block 512, REC 102 continues operation of link 110 based on the new antenna carriers configuration of link 110, now the current antenna carriers configuration. Thus, continuing with the above example, it will be appreciated that REC 102 transmits the first portion of the received data information in the last instance of the frame prior to the configuration change of link 110; and REC 102 transmits the second portion of the received data information in the first instance of the frame after the configuration change of link 110. Wherein, for example, prior to the configuration change streaming data of a particular antenna carrier can be transmitted over a first number of antenna carrier samples, and after the configuration change streaming data of the particular antenna carrier can be transmitted over a second number of antenna carrier samples, such as four. In addition, antenna carriers can be added or dropped. For example, a particular service provider may want more/fewer antenna carriers allocated in the evenings than during the daytime.

RE 104 operates in a similar manner, as represented by the flow on the right side of the dashed line of FIG. 5. At block 514, in parallel to block 502 as described above, RE 104 of RBS 100 operates link 110 between REC 102 and RE 104 based on the same antenna carrier configuration as REC 102 as indicated at block 502. Thus, RE 104 receives information over link 110 that is transmitted by REC 104, and de-frames this information before forwarding the streaming data for transmission by an antenna. RE 104 also receives and stores streaming data for the antenna carriers from one or more antennas, and frames this information before providing it to the REC 102.

At block 516, controller 160 of RE 104 receives the information from REC 102 (block 506) that indicates the mapping of the streaming data of one or more particular antenna carriers will change at a future time, such as to transmit a particular antenna carrier at a higher/lower data rate in the indicated direction, or to add/remove a particular antenna carrier. For example, REC 102 can provide to RE 104 the new mapping configuration of the particular antenna carrier in the downlink direction, and the time indicator as to when link 110 is to change operation. The time indicator can be, for example, a radio frame number for a specific radio frame to be received at RE 104 over link 110, as indicated by the dashed arrow between block 506 and block 516. In an embodiment, RE 104 provides a confirmation to REC 102 that RE 104 has received the change information. RE 104 can also provide information to REC 102 requesting that REC 102 facilitates a desired configuration change.

At block 518, controller 160 configures shadow registers 164 based on the new upcoming antenna carriers configuration. At block 520, in response to RE 104 determining that the indicator as to when link 110 is to change operation indicates that operation is to change now, controller 160 updates registers 163 with values at shadow registers 164 to cause the operation of link 110 at RE 104 to change operation. Thus, it will be appreciated that REC 102 receives the first portion of the received data information in the last instance of the frame prior to the configuration change of link 110; and REC 102 receives the second portion of the received data information in the first instance of the frame after the configuration change of link 110. Wherein, for example, prior to the configuration change streaming data of the particular antenna carrier, which includes the first portion, is receive in four antenna carrier samples of the frame, and after the configuration change streaming data of the particular antenna carrier, which includes the second portion, is received in two antenna samples of the frame. At block 522, RE 104 continues operation of link 110 based on the new antenna carriers configuration of link 110, now the current antenna carriers configuration.

The following describes the auto-negotiation process between REC 102 and RE 104 in further detail. REC 102 performs the auto-negotiation between REC 102 and RE 104 to determine the link configuration of link 110 that is supported by both REC 102 and RE 104 in the following manner. Since link 110 may have been set up when the link configurations of REC 102 operate and the link configurations of RE 104 operate, are not initially known to each other, REC 102 and RE 104 must try different link configurations until a common link configuration is determined. Thus, REC 102 performs the auto-negotiation between REC 102 and RE 104 to determine the link configuration of link 110 that is supported by both REC 102 and RE 104. The following description is based on the CPRI nomenclature, but is not limited to just CPRI interfaces, but instead, may be employed in RBSs utilizing any interfaces between a REC and a RE.

The auto-negotiation process starts by determining the link bit rate of link 110 and reaching layer 1 synchronization between REC 102 and RE 104. REC 102 starts to transmit over link 110 to RE 104 using, for example, the highest available link bit rate from link configurations table 129 of REC 102 and also attempts to receive over link 110 from RE 104 at the same link bit rate. If REC 102 does not reach layer 1 synchronization, (i.e., REC 102 does not receive the proper information and at the proper repetition rate), REC 102 selects, after an appropriate time delay, another available link bit rate from link configurations table 129 of REC 102, for example the next highest available link bit rate, and REC 102 starts to transmit/receive over link 110 to/from RE 104 using the other available link bit rate. This process proceeds until REC 102 reaches layer 1 synchronization with RE 104.

On the other side of link 110, RE 104 starts to receive over link 110 from REC 102 using, for example, the highest available link bit rate from link configurations table 169 of RE 104. If RE 104 does not reach layer 1 synchronization, (i.e., RE 104 does not receive the proper information and at the proper repetition rate), RE 104 selects, after a second appropriate time delay which may be different than the time delay utilized by REC 102, another available link bit rate from link configurations table 169 of RE 104, for example the next highest available link bit rate, and starts to receive over link 110 from REC 102 using the other available link bit rate. This process proceeds until RE 104 reaches layer 1 synchronization with REC 102. When RE 104 reaches synchronization of layer 1, RE 104 starts to transmit over link 110 to REC 102 at the same link bit rate that RE 104 successfully received at. At this point, synchronization of layer 1 of link 110 between REC 102 and RE 104 has been achieved with bi-directional communication.

In response to successfully determining the link bit rate that REC 102 and RE 104 support and achieving synchronization of layer 1 of link 110, the auto-negotiation process proceeds by determining the link protocol of link 110 that both REC 102 and RE 104 support. Similar to determining the link bit rate of link 110, REC 102 and RE 104 each propose, for example, the highest link protocol of its link configurations table 129 and 169, respectively. REC 102 and RE 104 then compare the other's proposed highest link protocol with all the link protocols of its link configurations table 129 and 169 to determine a match. If a match is not determined, REC 102 and RE 104 propose, for example, the next highest link protocol of its link configurations table 129 and 169 and determine if there is a matching link protocol as described above. This auto-negotiation process proceeds until REC 102 and RE 104 determines the same link protocol that both support and the auto-negotiation proceeds using the same link protocol.

In response to successfully determining the same link protocol, the auto-negotiation process proceeds to determine a layer 2 fast control and management link bit rate of link 110 for communication that utilizes Ethernet protocol and a layer 2 slow control and management link bit rate of link 110 for communication that utilizes HDLC protocol that both REC 102 and RE 104 support. The auto-negotiation process to determine the fast and the slow control and management link bit rate proceeds in parallel, with each fast/slow control management link bit rate determined similar to how the auto-negotiation process determined the link bit rate of link 110 as described above. As such, REC 102 and RE 104 determines the fast/slow control and management link bit rate of link 110 by successively trying an available fast/slow control and management link bit rate of each link configurations table 129 of REC 102 and 169 of RE 104 until the same fast/slow control and management link bit rate of link 110 that both REC 102 and RE 104 support is determined.

In response to successfully determining the same fast/slow control and management link bit rate, the auto-negotiation process proceeds to determine a vendor-specific interface usage that both REC 102 and RE 104 support. The auto-negotiation to determine the same vendor-specific interface usage, for example vendor-specific interface capabilities and capability limitations, can be accomplished in a similar manner as described above for the other link configuration characteristics and results in the same (preferred) vendor-specific interface usage based on vendor-specific requirements. At this point, the auto-negotiation has completed and determined the link configuration of link 110 that is supported by both REC 102 and RE 104 and the link configuration registers 123 include the values of the link configuration of link 110.

The interconnects disclosed herein are used to communicate information between various modules and devices either directly or indirectly. For example, each of the interconnects can be implemented as a passive device, such as conductive nodes that include one or more conductive traces, that transmits directly between the various modules and devices, or as an active device, where information being transmitted is buffered, for example stored and retrieved, in the process of being communicated between devices, such as at a first-in first-out memory or other memory device. In addition, a label associated with an interconnect can be used herein to refer to a signal and information transmitted by the interconnect.

REC 102, RE 104, controllers 120 and 160, layer 1 interfaces 121 and 161, layer 2 interfaces 122 and 162, framers 125 and 165, deframers 126 and 166, memories 128 and 168, DMAs 130 and 170, radio 167, network interface 112, and air interface 113 can be provided by, for example, an instruction based digital signal processor, an application specific integrated circuit device, a field programmable gate array (FPGA), a General Purpose Processor (GPP), another type of logic circuit capable of performing operations, the like, and combinations thereof. In an exemplary embodiment, REC 102 represents a digital baseband signal processor and RE 104 represents a digital signal processor.

According to one aspect, a method is disclosed in accordance with at least one embodiment of the present disclosure. The method includes receiving streaming data, the data includes a first portion from a first set of antenna carriers and a second portion from a second set of antenna carriers, where the first portion is to be processed prior to the second portion, and the first set of antenna carriers is different than the second set of antenna carriers. The method further includes streaming the first portion from a radio equipment control (REC) device in a first data frame of a plurality of data frames over an interface link when configured to operate based on a first mapping configuration that indicates a set of locations of the first data frame at which each antenna carrier of the first set of antenna carriers is to be streamed. The method also includes streaming the second portion from the REC device in a second data frame of the plurality of data frames over the interface link when configured to operate based on a second mapping configuration that indicates a different set of locations of the second data frame at which each antenna carrier of the second set of antenna carriers is to be streamed, where the first and second data frames are contiguous data frames.

In an embodiment, the method includes transmitting from the REC device for reception by a radio equipment (RE) device, prior to streaming the second portion of the data, the second mapping configuration and an indicator identifying when the interface link is to change operation based on the second mapping configuration. In an embodiment, the indicator is a specific frame number used to identify the second data frame of the plurality of data frames. In an embodiment, the method also includes configuring, prior to streaming the second portion of the data, a shadow register of the REC device based on the second mapping configuration. In an embodiment, the method further includes updating registers of the REC device with values at the shadow register to cause the operation of the interface link to change to operate based on the second mapping configuration in response to determining that the indicator identifies that the operation of the interface link is to be changed. In an embodiment, the specific frame number indicates that the second data frame is next data frame to be sent over the interface link. In an embodiment, at least one antenna carrier when transmitted over the first data frame has a first amount of data, and the at least one antenna carrier when transmitted over the second data frame has a second amount of data. In an embodiment, the interface link comprises one or more of a common public radio interface (CPRI) and an open base station architecture initiative (OBSAI) interface.

According to another aspect, a radio equipment control system is disclosed in accordance with at least one embodiment of the present disclosure. The radio equipment control system includes a radio equipment control (REC) device coupled to an interface link, the REC device to store a stream of data, the data includes a first portion from a first set of antenna carriers and a second portion from a second set of antenna carriers, where the first portion is to be processed prior to the second portion, and the first set of antenna carriers is different than the second set of antenna carriers. The radio equipment control system further includes a framer to frame the first portion in a first data frame of a plurality of data frames for streaming over the interface link, the first data frame based on a first mapping configuration that indicates a set of locations of the first data frame at which antenna carriers of the first portion is to be streamed and to frame the second portion in a second data frame of the plurality of data frames for streaming over the interface link, the second data frame based on a second mapping configuration that indicates a different set of locations of the second data frame at which antenna carriers of the second portion is to be streamed, where the first and second data frames are contiguous data frames.

In an embodiment, the REC device is further to transmit, prior to the first frame, the second mapping configuration for reception by a RE device and an indicator identifying when the interface link is to change operation based on the second mapping configuration. In an embodiment, the REC device is also to configure, prior to framing the second portion, a shadow register of the REC device based on the second mapping configuration. In an embodiment, the REC device is further to update, prior to framing the second portion, registers of the REC device with values at the shadow register of the REC device to cause the operation of the interface link to change to frame the second portion based on the second mapping configuration in response to determining that the indicator identifies that the operation of the interface link is to be changed. In an embodiment, the indicator is a specific frame number used to identify the second data frame of the plurality of data frames. In an embodiment, the specific frame number indicates that the second data frame is next data frame to be sent over the interface link. In an embodiment, the interface link includes one or more of a common public radio interface (CPRI) and an open base station architecture initiative (OBSAI) interface.

According to another aspect, a method is disclosed in accordance with at least one embodiment of the present disclosure. The method includes receiving by a radio equipment (RE) device a first portion of streaming data from a first set of antenna carriers in a first data frame of a plurality of data frames over an interface link when configured to operate based on a first mapping configuration that indicates a set of locations of the first data frame at which each antenna carrier of the first set of antenna carriers is to be received. The method also includes receiving by the RE device a second portion of streaming data from a second set of antenna carriers in a second data frame of a plurality of data frames over the interface link when configured to operate based on a second mapping configuration that indicates a different set of locations of the second data frame at which at which each antenna carrier of the second set of antenna carriers is to be received, where the first and second data frames are contiguous data frames, the first portion is to be processed prior to the second portion, and the first set of antenna carriers is different than the second set of antenna carriers.

In an embodiment, the method also includes receiving by the RE device from a transmission by a radio equipment control (REC) device, prior to receiving the second portion of the data, the second mapping configuration and an indicator identifying when the interface link is to change operation based on the second mapping configuration. In an embodiment, the indicator is a specific frame number used to identify the second data frame of the plurality of data frames. In an embodiment, the method further includes configuring, prior to receiving the second portion of the data, a shadow register of the RE device based on the second mapping configuration. In an embodiment, the method also includes updating registers of the REC device with values at the shadow register to cause the operation of the interface link to change to operate based on the second mapping configuration in response to determining that the indicator identifies that the operation of the interface link is to be changed.

According to yet another aspect, a method is disclosed in accordance with at least one embodiment of the present disclosure. The method includes receiving streaming data, the data includes a first portion for a first set of antenna carriers and a second portion for the first set of antenna carriers, where the first portion is to be processed prior to the second portion. The method also includes streaming the first portion from a radio equipment control (REC) device in a first data frame of a plurality of data frames over an interface link when configured to operate based on a first mapping configuration that indicates a set of locations of the first data frame at which each antenna carrier of the first set of antenna carriers is to be streamed. The method further includes streaming the second portion from the REC device in a second data frame of the plurality of data frames over the interface link when configured to operate based on a second mapping configuration that indicates a different set of locations of the second data frame at which each antenna carrier of the second set of antenna carriers is to be streamed, where the first and second data frames are contiguous data frames.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

As used herein, the term "machine-executable code" can refer to instructions that can be provided to a processing device and can be executed by an execution unit. The machine-executable code can be provided from a system memory, and can include a system BIOS, firmware, or other programs. In addition, machine-executable code can refer to microcode instructions that can be used by a processing device to execute instructions, and can be provided by a microcode memory of the processing device.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
providing, at a radio equipment control (REC) device and at a radio equipment (RC) device, a first mapping configuration for data streaming over a communication link between the REC and RE devices, wherein the first mapping configuration indicates a first bandwidth for each antenna carrier of a set of antenna carriers of the RE device;
streaming data frames over the communication link in accordance with the first mapping configuration;
providing, at the REC and RE devices, a second mapping configuration for data streaming over the communication link, wherein the second mapping configuration indicates a second bandwidth for each antenna carrier, at least one second bandwidth for a particular antenna carrier being different from a first bandwidth for the particular antenna carrier;
configuring a shadow register of the REC device based on the second mapping configuration;
configuring a shadow register of the RE device based on the second mapping configuration;
providing, at the REC and RE devices, an indication identifying when the communication link is to change operation from the first mapping configuration to the second mapping configuration; and
after streaming a data frame associated with the indication in accordance with the first mapping configuration, streaming the data frames over the communication link in accordance with the second mapping configuration.

2. The method of claim 1, wherein the indicator specifies a number of data frames.

3. The method of claim 1, wherein the indicator is a specific frame number used to identify a particular data frame of the data frame.

4. The method of claim 1, further comprising:
updating a control register of the REC device with a value from the shadow register of the REC device prior to streaming the data frames over the communication link in accordance with the second mapping configuration; and
updating a control register of the RE device with a value from the shadow register of the RE device prior to streaming the data frames over the communication link in accordance with the second mapping configuration.

5. The method of claim 1, wherein the first bandwidth for each antenna carrier indicates a number of data frames allocated to each antenna carrier.

6. The method of claim 1, wherein the communication link comprises one or more of a common public radio interface (CPRI) and an open base station architecture initiative (OBSAI) interface.

7. A radio equipment control system, comprising:
a radio equipment control (REC) device; and
a radio equipment (RE) device coupled to the REC device via a communication link;
wherein, the REC and RE devices are each configured to:
operate in accordance with a first mapping configuration to stream data over the communication link between the REC and RE devices, wherein the first mapping configuration indicates a first bandwidth for each antenna carrier of a set of antenna carriers of the RE device;
receive a second mapping configuration for data streaming over the communication link, wherein the second mapping configuration indicates a second bandwidth for each antenna carrier, at least one second bandwidth for a particular antenna carrier being different from a first bandwidth for the particular antenna carrier;
receive an indication identifying when the communication link is to change operation from the first mapping configuration to the second mapping configuration;
determine that a data frame associated with the indication has been streamed via the communication link; and
after determining that the data frame has been streamed, operate in accordance with the second mapping configuration to stream data over the communication link; and
wherein, after providing the second mapping configuration at the REC and RE devices:
the REC device further configures a shadow register of the REC device based on the second mapping configuration; and
the RE device further configures a shadow register of the RE device based on the second mapping configuration.

8. The radio equipment control system of claim 7, wherein the RE device receives the second mapping configuration from the REC device.

9. The radio equipment control system of claim 7, wherein:
update a control register of the REC device with a value from the shadow register of the REC device prior to streaming the data frames over the communication link in accordance with the second mapping configuration; and
update a control register of the RE device with a value from the shadow register of the RE device prior to streaming the data frames over the communication link in accordance with the second mapping configuration.

10. The radio equipment control system of claim 7, wherein the indicator specifies a number of data frames.

11. The radio equipment control system of claim 7, wherein the indicator is a specific frame number used to identify a particular data frame of the data frames.

12. The radio equipment control system of claim 7, wherein the communication link comprises one or more of a common public radio interface (CPRI) and an open base station architecture initiative (OBSAI) interface.

13. A radio equipment control (REC) device, comprising:
a communication link; and
a register that directs the communication link to operate in accordance with a mapping configuration to stream data over the communication link between the REC device and a radio equipment (RE) device coupled to the communication link, wherein the mapping configuration indicates a bandwidth for each antenna carrier of a set of antenna carriers of the RE device;
the REC device configured to:
receive a first mapping configuration that indicates a first bandwidth for each antenna carrier;

store the first mapping configuration to the register;
send the first mapping configuration to the RE device;
stream data over the communication link in accordance with the first mapping configuration;
receive a second mapping configuration that indicates a second bandwidth for each antenna carrier, wherein the second mapping configuration indicates a second bandwidth for each antenna carrier, at least one second bandwidth for a particular antenna carrier being different from a first bandwidth for the particular antenna carrier;
configure a shadow register of the REC device based on the second mapping configuration;
determine an indication identifying when the communication link is to change operation from the first mapping configuration to the second mapping configuration;
send the second mapping configuration and the indication to the RE device;
determine that a data frame associated with the indication has been streamed via the communication link;
store the second mapping configuration to the register in response to determining that the data frame has been streamed; and
stream data over the communication link in accordance with the second mapping configuration in further response to determining that the data frame has been streamed.

14. The REC device of claim 13, wherein the indicator specifies a number of data frames.

15. The REC device of claim 13, wherein the indicator is a specific frame number used to identify a particular data frame of the data frames.

16. The REC device of claim 13, wherein, after providing the second mapping configuration at the RE device, the REC device further:
updates the register with a value from the shadow register prior to streaming the data over the communication link in accordance with the second mapping configuration.

17. The REC device of claim 13, wherein the communication link comprises one or more of a common public radio interface (CPRI) and an open base station architecture initiative (OBSAI) interface.

\* \* \* \* \*